United States Patent
Baron

(10) Patent No.: US 10,953,355 B2
(45) Date of Patent: *Mar. 23, 2021

(54) FILTER ELEMENT

(71) Applicant: CLEAR EDGE-GERMANY GMBH, Geldern-Walbeck (DE)

(72) Inventor: Dominic Baron, Bolton Lancashire (GB)

(73) Assignee: CLEAR EDGE-GERMANY GMBH, Geldern-Walbeck (DE)

( * ) Notice: Subject to any disclaimer, the term of this patent is extended or adjusted under 35 U.S.C. 154(b) by 143 days.

This patent is subject to a terminal disclaimer.

(21) Appl. No.: 16/184,585

(22) Filed: Nov. 8, 2018

(65) Prior Publication Data

US 2019/0076764 A1    Mar. 14, 2019

Related U.S. Application Data

(63) Continuation-in-part of application No. 14/915,202, filed as application No. PCT/EP2014/068407 on Aug. 29, 2014, now abandoned.

(30) Foreign Application Priority Data

Aug. 29, 2013   (GB) ..................................... 1315362

(51) Int. Cl.
| | |
|---|---|
| *B01D 39/08* | (2006.01) |
| *B01D 25/12* | (2006.01) |
| *D03D 1/00* | (2006.01) |
| *D03D 11/00* | (2006.01) |
| *D03D 15/00* | (2006.01) |
| *D06M 15/55* | (2006.01) |
| *D06M 15/41* | (2006.01) |
| *D06N 3/12* | (2006.01) |

(52) U.S. Cl.
CPC ........... *B01D 39/083* (2013.01); *B01D 25/12* (2013.01); *D03D 1/00* (2013.01); *D03D 1/0041* (2013.01); *D03D 11/00* (2013.01); *D03D 15/00* (2013.01); *D06M 15/41* (2013.01); *D06M 15/55* (2013.01); *D06N 3/12* (2013.01); *B01D 2239/0478* (2013.01); *B01D 2239/0613* (2013.01); *B01D 2239/1291* (2013.01); *D06N 2211/30* (2013.01); *D10B 2331/02* (2013.01); *D10B 2505/04* (2013.01)

(58) Field of Classification Search
CPC ...... B01D 2239/0478; B01D 2239/065; B01D 39/083

See application file for complete search history.

(56) References Cited

U.S. PATENT DOCUMENTS

| | | |
|---|---|---|
| 5,795,835 A | 8/1998 | Bruner |
| 2016/0214043 A1 | 7/2016 | Baron |

FOREIGN PATENT DOCUMENTS

| | | |
|---|---|---|
| EP | 0048962 A2 | 9/1981 |
| WO | 2015/028624 A1 | 3/2015 |

OTHER PUBLICATIONS

Patent Cooperation Treaty: International Search Report and Written Opinion for PCT/EP2014/068407 dated Jan. 12, 2015; 7 pages.

*Primary Examiner* — Dirk R Bass
(74) *Attorney, Agent, or Firm* — Schwabe Williamson & Wyatt, PC

(57) ABSTRACT

A filter element comprising two layers of weft (1) interlaced with warp (2). Additionally laid-in (3) yarns are provided in-between the two weft layers. The laid-in yarns are not interlaced with the weft.

10 Claims, 2 Drawing Sheets

FILTER ELEMENT

CROSS-REFERENCE TO RELATED APPLICATION

Figure 1:
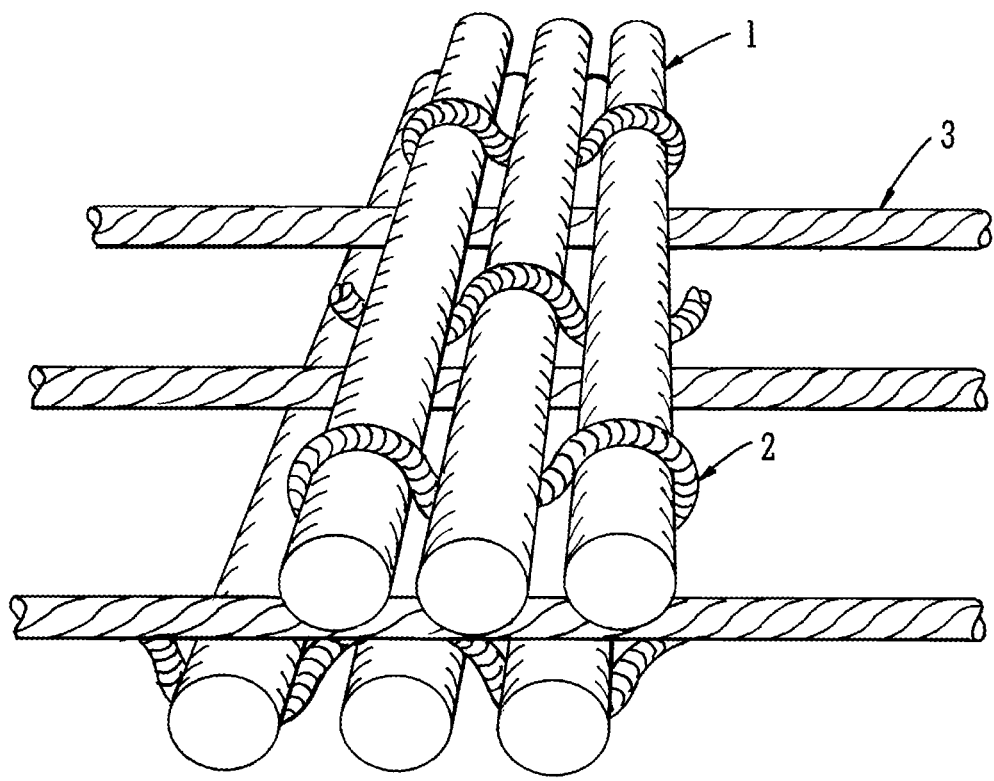

This application is a continuation-in-part of U.S. application Ser. No. 14/915,202, filed Feb. 26, 2016, which is a national phase entry under 35 USC § 371 of International Application No. PCT/EP2014/068407, filed Aug. 29, 2014, which designates the United States of America, which claims priority to UK Application No. 1315362.2, filed Aug. 29, 2013. The entire disclosures of each of these applications are incorporated herein by reference and for all purposes.

The present invention relates to a filter element (such as a filter cloth), a filtration apparatus (such as a large chamber filter press or a Lasta press) comprising a filter element, and use of a filter element in a filtration apparatus (such as a large chamber filter press or a Lasta press).

Filter elements often comprise woven fabric, that is a fabric comprising warp and weft yarns, wherein the weft is threaded through and interlaced with the warp. Warp yarns are typically longitudinal (i.e. run in the machine direction) and weft yarns are typically transverse (i.e. run perpendicular to the machine direction; i.e. the cross-machine direction). Since woven structures possess an inherent degree of stretch, such filter elements are susceptible to elongation, particularly when used on large filter presses where the elements are placed under tension when subjected to the load of a heavy filter cake. This can mean significant elongation which results in a baggy filter element which has poor fit and can crease, resulting in poor sealing. Due to the high pressures involved in filtration, poor sealing is obviously highly disadvantageous. Furthermore, poor fit can also lead to the creation of points of increased wear on the filter element, resulting in shorter lifetimes or premature failure of the filter element through mechanical damage. Consequently it is desirable to reduce the susceptibility of filter elements to elongation, and/or to increase their modulus. In addition, filter elements can be susceptible to abrasion, for example from the filtrate. Such abrasion reduces the working life of the filter element. It may therefore be additionally desirable to improve the abrasion resistance of filter elements in order to prolong their working life.

According to a first embodiment of the present invention, there is provided a filter element comprising weft, warp and laid-in yarns, wherein the laid-in yarns do not interlace with the weft yarns and run substantially parallel to the warp yarns, the weft yarns run substantially perpendicular to the warp yarns, and wherein the ratio of the laid-in yarns to warp yarns is at least 1:4.

According to a second embodiment of the present invention, there is provided a filtration apparatus, such as a large chamber filter press or a Lasta press, comprising a filter element according to the first embodiment.

According to a third embodiment of the present invention, there is provided the use of a filter element according to the first embodiment in a filtration apparatus such as a large chamber filter press or a Lasta press.

According to a fourth embodiment of the present invention, there is provided an assembly comprising a filter element according to the first embodiment and a substantially vertical filter plate, wherein the filter element is oriented such that the laid in yarns run substantially vertically down the filter plate.

The laid-in yarns of the present invention give rise to filter elements having an increased modulus, i.e. a reduced tendency to elongation. Without wishing to be bound by theory, it is believed that the laid-in yarns reduce elongation as they do not interlace with any weft yarns, so that any elongation effects due to fabric crimp are reduced. Using laid in yarns in the warp direction, low load elongation values of 0.5% or less @400 N/5 cm are achievable according to DIN EN ISO (13934) without adversely affecting filtration performance.

In the case where it is desirable to additionally improve abrasion resistance, the weft yarns can comprise an abrasion resistant yarn, for example polyamide, e.g. NYLON. The weft yarns comprising polyamide, e.g. NYLON, give rise to filter elements having improved abrasion resistance.

Filter elements typically have top and bottom surfaces, wherein one or both of these surfaces can be used for filtration. Preferably the filter element has weft yarns comprising polyamide, e.g. NYLON as the predominant yarns on both the top and bottom surfaces of the filter element, as this gives particularly improved abrasion resistance. When the filter element has a double-faced sateen weave, e.g. a weave of double faced construction comprising polyamide, e.g. NYLON, yarns on both surfaces, abrasion resistance is particularly improved.

The weft yarns comprising polyamide, e.g. NYLON, may comprise at least 80% polyamide, e.g. NYLON, preferably 100% polyamide, e.g. NYLON. The laid-in yarns do not interlace with any weft yarns.

The filter element ideally comprises at least two layers of weft and in one embodiment comprises only two layers of weft.

When the filter element comprises two layers of weft, the warp yarns interlace with the weft yarns in both layers to link the weft layers. This holds the laid-in yarns in place and prevents relative movement of the weft layers. Crimping of the filter element fabric also helps to retain the laid-in yarns in place between the weft layers.

The ratio of laid-in yarns to warp yarns is at least 1:4, preferably at least 1:3, more preferably at least 1:2, most preferably at least 1:1, but it can also be 2:3.

When the ratio is 1:1, for every laid-in yarn there is an interlacing warp yarn that compresses the laid-in yarn to hold it in place within the woven structure. For example, in a filter element having 5250 warp yarns there will be 2625 laid-in yarns and 2625 interlacing warp yarns that compress the laid-in yarns into the woven structure. The compressive force exerted on the laid-in yarns by the interlacing warp yarns means that the laid in yarns cannot be pulled out unless the woven structure is cut in the longitudinal direction. It will be appreciated that a greater compressive force will be exerted on the laid-in yarns when the ratio of laid-in yarns to warp yarns is 1:2, 1:3 or 1:4 for example.

The laid-in yarns in one embodiment comprise any of the following either alone or in combination:—polypropylene (PP), polyester (PET), polyethylene (PE), polybutylene terephthalate (PBT), polyphenylene sulfide (PPS) and/or aramid, such as KEVLAR, materials. In one embodiment their linear density is from 150 to 4400 dtex (grams/10,000 m). In another embodiment this is 1100 to 2200 dtex. The laid-in yarns can be multifilament staple or monofilament.

The warp yarns typically comprise any of the following either alone or in combination:—PP, PET, PE, PBT, PPS or aramid, eg KEVLAR, materials. Their linear density in one embodiment may be in the range from 150 to 4400 dtex. In another embodiment this is in the range from 1100 to 2200 dtex. The warp yarns can be multifilament staple or monofilament, and/or the warp yarns can be woven in any of plain weave, all twill combinations, or all satin combinations.

The weft yarns may comprise an abrasion resistant yarn, preferably PA, e.g. NYLON, and may also or alternatively comprise PP, PET, PE, PBT, PPS or aramid (e.g. KEVLAR) material. In one embodiment the weft yarns consist essentially of, or consist of, PA (e.g. NYLON). In one embodiment their linear density is from 150 to 4400 dtex, and in another embodiment from 1100 to 2200 dtex. The weft yarns may be multifilament staple or monofilament.

The filter element may comprise at least 28 warp yarns/cm. This high thread count enables a compressive force to be exerted on the laid-in yarns that is sufficient to retain the laid-in yarns in place between the weft layers. In some embodiments the filter element may comprise at least 41 warp yarns/cm. An abrasion resistant coating, for example of glue or resin, may optionally be applied to the filter element to increase lifetime. This coating may be (but is not limited to), for example, a two part epoxy or similar. Typically, the coating is an aqueous Phenol Formaldehyde resole system. The coating can also be impregnated into the fabric of the filter element.

When a woven filter element is cut to the desired dimensions, it's possible to pull the warp and weft yarns from the woven structure. Therefore, to avoid the warp and weft yarns unraveling during use the cut edges are typically sealed using ultrasonic technology. In particular, a sonotrode may be provided to deliver ultrasound energy through the yarns of the filter element to an anvil such that the fabric surface is transformed. The design of the anvil imparts parallel or diagonal lines down the cut edges which binds the warp, weft and laid-in yarns together thereby sealing the edge. It will be appreciated that any technology capable of sealing the edges could be used and that sealing the edges of the filter element also contributes to holding the laid-in yarns in place between the interlacing warp and weft yarns and prevents fraying of adjacent weft layers.

The coating can typically be applied using a coating machine comprising a simple Knife over Air system, with a 'J' blade, which causes the resin to be forced into the filter element, thus giving an impregnation, rather than a discrete coating on top of the filter element. The coating should not, however, markedly alter the permeability of the filter element.

Usually the filter element is first coated and dried, and then cured preferably by passing down a stenter. Afterwards, hot calandering, at for example 145° C., is preferred. Curing the filter element causes bonds to form between the laid-in yarns and the interlaced warp/weft yarns that may help to hold the laid-in yarns in place within the woven structure.

When fabricating the filter element, due consideration must be observed with regard to correct orientation of the woven fabric, so as to gain maximum benefit from the inherent resistance to elongation in the warp direction. That is, the filter element should be oriented such that the warp yarns and laid-in yarns are present in the direction which is subjected to the highest loads. For example, in the case of a plate and frame filter press, the filter element should be constructed such that the warp and laid-in yarns are oriented in a top to bottom orientation, with the weft yarns being oriented in the left to right direction.

The present invention will now be illustrated, by way of example only, by reference to FIG. 1 which shows a schematic diagram of a filter element according to the invention.

In FIG. 1, two layers of weft yarns 1 and warp yarns 2 are interlaced to create a fabric, wherein the weft yarns run perpendicular to the machine direction and the warp yarns run parallel to it. Although not shown in FIG. 1, the warp yarns 2 interlace weft yarns 1 in the two weft layers to link the two weft layers. Laid-in yarns 3 placed in-between the two weft layers also run parallel to the machine direction. There is a laid-in yarn present between each pair of warp yarns, such that the ratio of laid-in yarns to warp yarns is 1:1. The weft yarns 1 may comprise an abrasion resistant yarn such as polyamide, e.g. NYLON.

Figure 2:
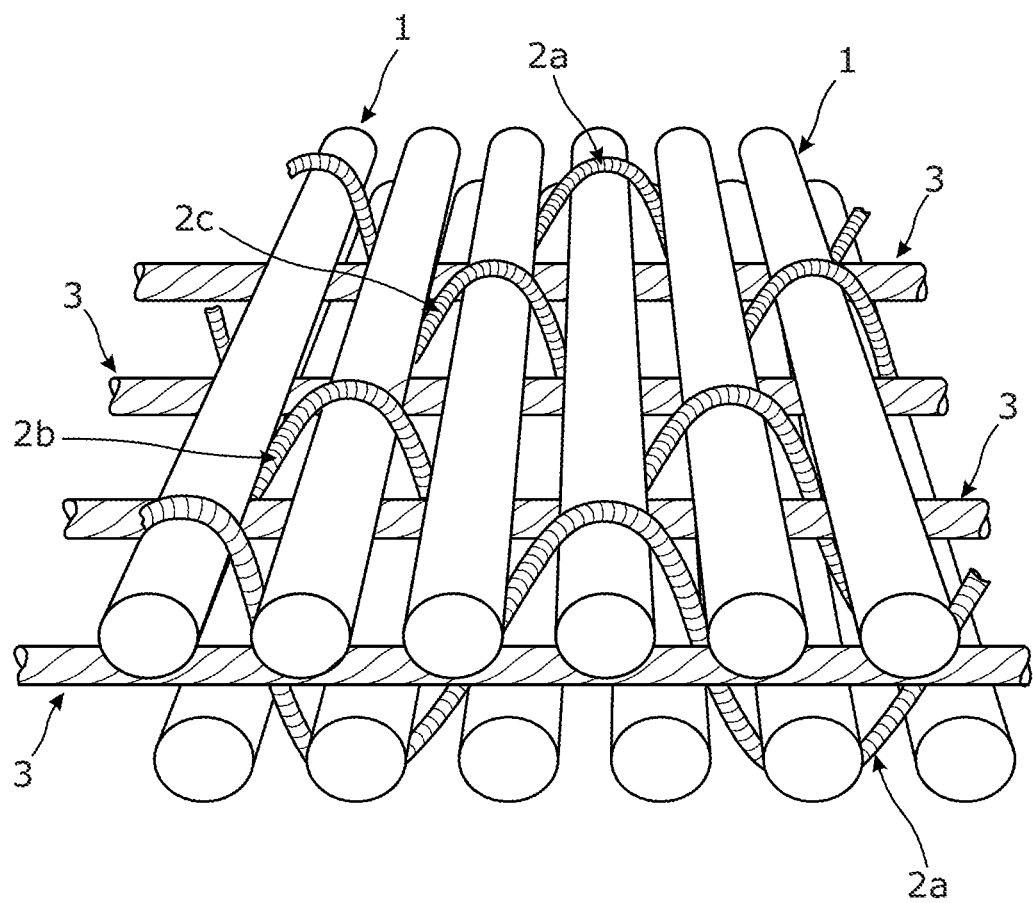

In FIG. 2, two layers of weft yarns 1 and warp yarns 2 are interlaced to create a fabric, wherein the weft yarns run perpendicular to the machine direction and the warp yarns run parallel to it. The warp yarns 2a, 2b and 2c interlace the weft yarns 1 to link the two weft layers. Laid-in yarns 3 placed in-between the two weft layers also run parallel to the machine direction. In this embodiment, the ratio of laid-in yarns 3 to warp yarns 2 is 1:1. The weft yarns 1 comprise an abrasion resistant material such as NYLON.

It is to be understood that the above described embodiment is by way of illustration only. Many modifications and variations are possible. For example, more layers of weft may be included.

The invention claimed is:

1. A filter cloth comprising interlaced weft and warp yarns, and laid-in yarns, wherein:
   the filter cloth comprises two layers of weft yarns, with the laid-in yarns located between said layers of weft yarns;
   the laid-in yarns do not interlace with the weft yarns and run substantially parallel to the warp yarns, the laid-in yarns having a linear density of 150 to 4400 dtex (grams/10,000 m);
   the weft yarns run substantially perpendicular to the warp yarns;
   the warp yarns are interlaced between the two layers of weft yarns to provide a compressive force to hold the laid-in yarns between the interlaced warp and weft yarns, and wherein;
   the ratio of the laid-in yarns to warp yarns is at least 1:4.

2. A filter cloth according to claim 1, wherein the ratio of laid-in yarns to warp yarns is approximately 1:1.

3. A filter cloth according to claim 1, wherein the laid-in, warp and/or weft yarns comprise any of the following either alone or in combination: PP, PET, PE, PBT, PPS and/or Kevlar materials.

4. A filter cloth according to claim 1, wherein the weft yarns consist essentially of an abrasion resistant yarn.

5. A filter cloth according to claim 4, wherein the abrasion resistant yarn is polyamide.

6. A filter cloth according to claim 1, wherein the filter cloth additionally comprises an abrasion resistant coating.

7. A filtration apparatus comprising a filter cloth according to claim 1.

8. A filtration apparatus according to claim 7, wherein the filtration apparatus is a filter press or a Lasta press.

9. An assembly comprising a filter cloth according to claim 1 and a substantially vertical filter plate, wherein the filter cloth is oriented such that the laid-in yarns run substantially vertically down the filter plate.

10. A filter cloth according to claim 1, wherein the laid-in yarns have a linear density of 1100 to 2200 dtex (grams/10,000 m).

* * * * *